United States Patent [19]

Lowe

[11] 4,439,900
[45] Apr. 3, 1984

[54] SCAFFOLDING DEVICES

[75] Inventor: Jack G. Lowe, Belbroughton, near Stourbridge, England

[73] Assignee: Burton Delingpole & Company Limited, Warley, England

[21] Appl. No.: 282,582

[22] Filed: Jul. 13, 1981

[30] Foreign Application Priority Data

Jul. 16, 1980 [GB] United Kingdom ............... 8023169

[51] Int. Cl.³ .......................... F16L 3/04; F16L 3/10; F16L 3/24
[52] U.S. Cl. ..................................... 24/514; 24/521; 248/72; 403/386
[58] Field of Search .............. 24/248 SA, 249 R, 254; 403/385, 386, 344; 248/72

[56] References Cited

U.S. PATENT DOCUMENTS

| 1,319,652 | 10/1919 | Korns | 248/78 |
|---|---|---|---|
| 1,646,881 | 10/1927 | Scheer | 248/72 |
| 1,920,602 | 8/1933 | Smallwood | 24/249 R |
| 2,020,102 | 11/1935 | Burton et al. | 403/385 |
| 2,165,221 | 7/1939 | Burton | 403/286 |
| 2,175,453 | 10/1939 | Barcy | 248/72 |
| 2,865,587 | 12/1958 | D'Azzo | 248/72 |
| 3,537,150 | 11/1970 | Emberson | 24/249 R |
| 4,320,882 | 3/1982 | Bachle | 248/72 |

FOREIGN PATENT DOCUMENTS

| 978852 | 4/1951 | France | 248/72 |
|---|---|---|---|
| 1017872 | 12/1952 | France | 248/72 |
| 564855 | 10/1944 | United Kingdom | 248/72 |
| 931134 | 7/1963 | United Kingdom | 248/72 |
| 1011182 | 11/1965 | United Kingdom | 248/72 |
| 1535209 | 12/1978 | United Kingdom | 248/72 |
| 1537229 | 12/1978 | United Kingdom | 403/386 |
| 1537257 | 12/1978 | United Kingdom | 248/72 |

Primary Examiner—Paul J. Hirsch
Attorney, Agent, or Firm—Parmelee, Miller, Welsh & Kratz

[57] ABSTRACT

The invention is concerned with a clamping device for clamping together a scaffolding pole and the flange of a construction member. The device comprises two body parts having arcuate seats, the two body parts being connected together at one end thereof for relative pivotal movement, and the device comprising clamping means to secure the body parts in clamping engagement with the scaffolding pole.

The arcuate seats are spaced apart in the axial direction, and one body part comprises an integral extension portion, which extends generally parallel to the longitudinal axis, such that the arcuate seat on the other body part lies (in the axial direction) between the arcuate seat of said one body part and a flange-engaging surface of the extension portion. In this manner by tightening a single nut the clamping means may be operated to secure the clamping device to the scaffolding pole, and simultaneously clamp the flange between the extension portion and the scaffolding pole.

8 Claims, 4 Drawing Figures

SCAFFOLDING DEVICES

BACKGROUND OF THE INVENTION

This invention relates to devices for clamping to a scaffolding pole in construction work when, as is sometimes the case, it is required to connect a scaffolding pole to a flange of a construction member such as an angle section beam, T-section beam or I-section beam. The term "scaffolding pole" is used herein generically to denote elongate scaffold elements which are of uniform cross-section, and which are usually, but not necessarily, of circular, hollow cross-section.

One previous form of clamping device proposed for this purpose has one part comprising a body to which is hinged a cap and also one end of a clamping bolt, the body having an arcuate seating to engage one side of the scaffolding pole and the cap having an arcuate seating to engage on the opposite side of the pole, the bolt being engaged with the free end of the pivoted cap and a nut being tightened on the bolt to clamp the pole firmly between the cap and the body. This previous device also has two further parts, one being a U-shaped clamp and the other being a T-shaped bolt which is engaged with the body of the device so that the head of the T sits in a recess in the arcuate surface of the body and the shank of the bolt projects through a hole at the base of the recess and then is passed through a hole in the base of the U-shaped clamp with a clamping nut being provided on the free end of the T-shaped bolt. In use the device is first clamped to a scaffolding pole, with the U-shaped clamp arranged so that one of its legs engages the flange of the construction member while the other of its legs engages the tube at a position alongside the body of the device, and the nut on the T bolt is then tightened.

Such a device is described in U.K. patent specification No. 1,537,257.

With this previous proposal there are three separate parts which can become detached and two clamping bolts have to be tightened up to secure the device in position and in some casea an operator may have to manipulate and tighten the two clamping bolts simultaneously whilst moving the device into the correct position.

The object of the present invention is to provide an improved form of clamping device for the purpose set out above, which has the advantages of being of simpler construction and comprising a smaller number of separate parts.

BRIEF SUMMARY OF THE INVENTION

According to this invention there is provided a device for clamping together a scaffolding pole and a flange of a construction member, the device comprising a body having an arcuate seat to engage a scaffolding pole, clamping means to clamp the body to the pole, the body comprising a portion which prjects from the body in a direction away from the arcuate seat, said portion comprising a flange-engaging surface, and the construction and arrangement being such that the body can be clamped to a scaffolding pole with the flange-engaging surface of the portion bearing against one side of the flange with the other side of the flange in engagement with the scaffolding pole.

Preferably operation of the clamping means to clamp the body to the scaffolding pole is also effective simultaneously to urge the flange-engaging surface towards the flange. Most conveniently the clamping means comprises a single member (such as a clamping nut) to effect both clamping of the body to the scaffolding pole and the urging of the flange-engaging surface towards the flange.

Preferably the body comprises two body members, each comprising an arcuate seat, and conveniently the two body members are pivotally connected together on one side, the clamping means being operative between the body members on the other side of the device.

Desirably the arcuate seats of the body members are spaced apart in an axial direction, said portion being integral with one of the body members with the arcuate seat of the other body member lying (in the axial direction) between the arcuate seat of said one body member and the flange-engaging surface of the said portion.

According to this invention there is also provided a device for clamping together a scaffolding pole and a flange of a construction member, the device comprising a first body member having an arcuate seat to engage one side of a scaffolding pole, a second body member connected to the first body member and having an arcuate seat to engage the other side of the scaffolding pole at a position axially spaced from the arcuate seat of the first body member, an extension integral with the second body member and which extends generally axially away from the arcuate seat thereof, and means to clamp the body members together, the construction and arrangement being such that operation of the clamping means to clamp the body members together on opposite sides of a scaffolding pole is effective to cause the extension to move towards the longitudinal axis of the scaffolding pole.

Most conveniently the arcuate seat of the first body member lies (in the axial direction) between a flange-engaging surface of the extension and the arcuate seat of the second body member.

Preferably the body members are connected together in a manner such as to permit limited tilting movement between the body members on tightening of the clamping means.

The arcuate seat or seats may be arranged to engage the scaffolding pole over an area, or (particularly in the case of the arcuate seat of the second body member) may be arranged to engage the scaffolding pole in substantially line contact. Thus, desirably the arcuate seat of the second body member is convex in longitudinal cross-section, to permit rolling movement of the arcuate seat of the second body member on the scaffolding pole.

DETAILED DESCRIPTION OF THE PREFERRED EMBODIMENTS

Figure 1:
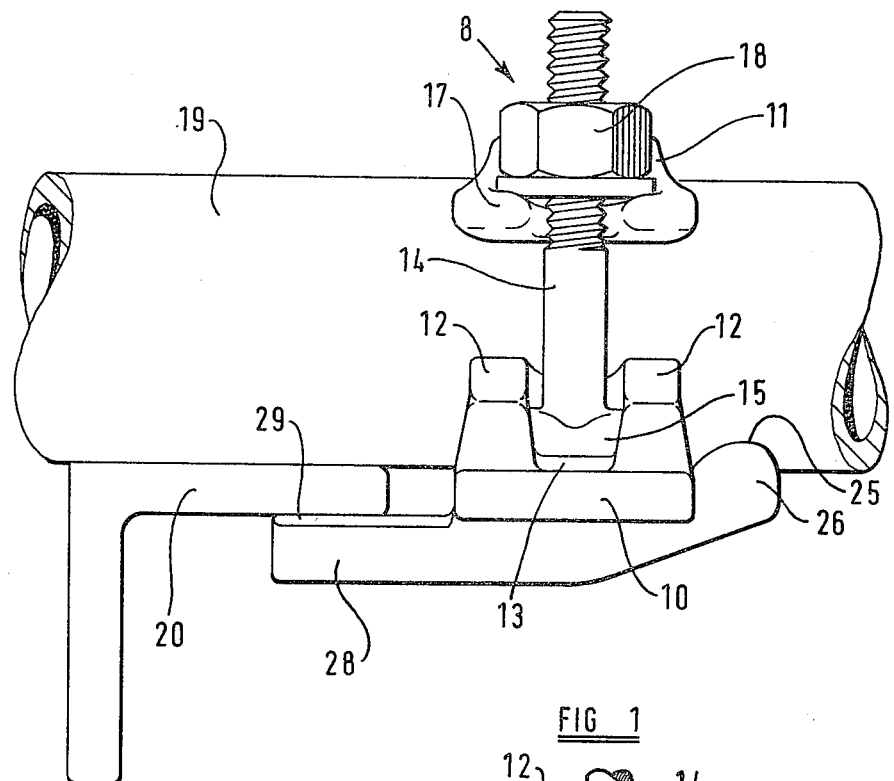
FIG. 1 is a side elevation showing a scaffolding pole clamped to the flange of an angle section beam by a device which is a preferred embodiment of the invention, and which has been selected for the purposes of illustrating the invention by way of example.
Figure 4:
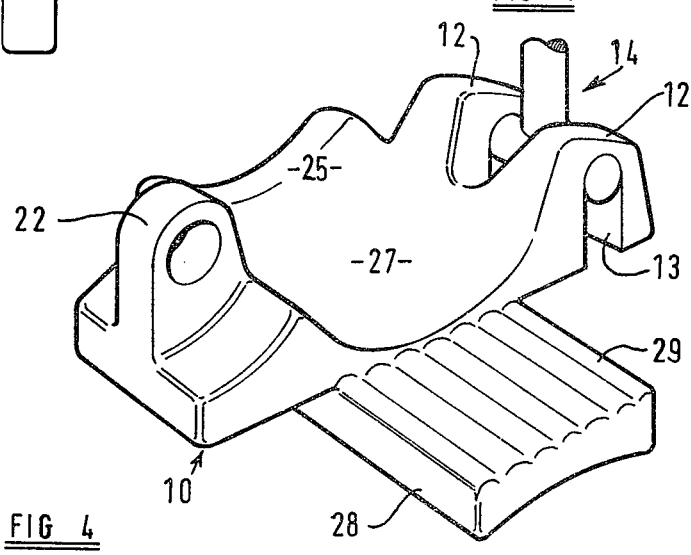
FIG. 4 is a perspective view of one of the body members of the device.

The clamping device which is the preferred embodiment of this invention is particularly for use in connecting together a scaffolding pole 19 and a flange 20 of a construction member, which may be an angle section beam, a T-section beam, or an I-section beam. The device comprises a body 8 comprising a first body part generally in the form of a cap of a conventional coupler, of the kind utilised to connect together two scaffolding poles, and a second body part 10. The body part 10 is provided at one end with an apertured lug 22, and at the other end with a pair of spaced lugs 12 which define therebetween a pocket 13 in which the head 15 of a T-bolt 14 may be located.

The body part 11 is provided at one end with a pair of spaced apertured lugs 24, and at the other end with a bifurcated portion 17 within which a clamping nut 18 for the T-bolt may be positioned.

Figure 3:
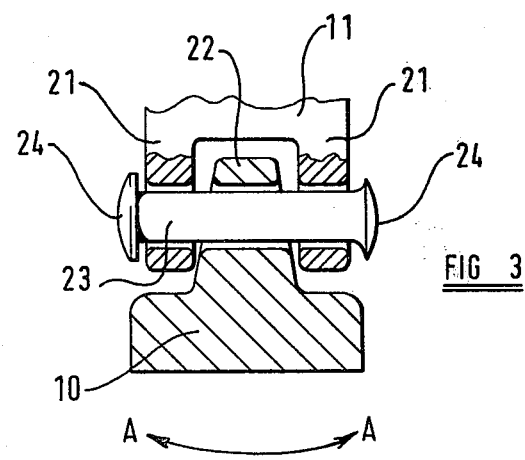
FIG. 3 is a scrap section showing the pivotal connection between two body members of the device.

The lug 22 is located between the lugs 21 (FIG. 3) and a pivot pin 24 extends through the apertures of the lugs, whereby the body parts 10 and 11 are maintained pivotally connected together. The clearance between the lugs 22 and the lugs 21, and between the pin 24 and the apertures in said lugs is such as to enable limited tilting movement of the body part 10 relative to the body part 11, generally in the direction A—A indicated in FIG. 3.

Figure 2:
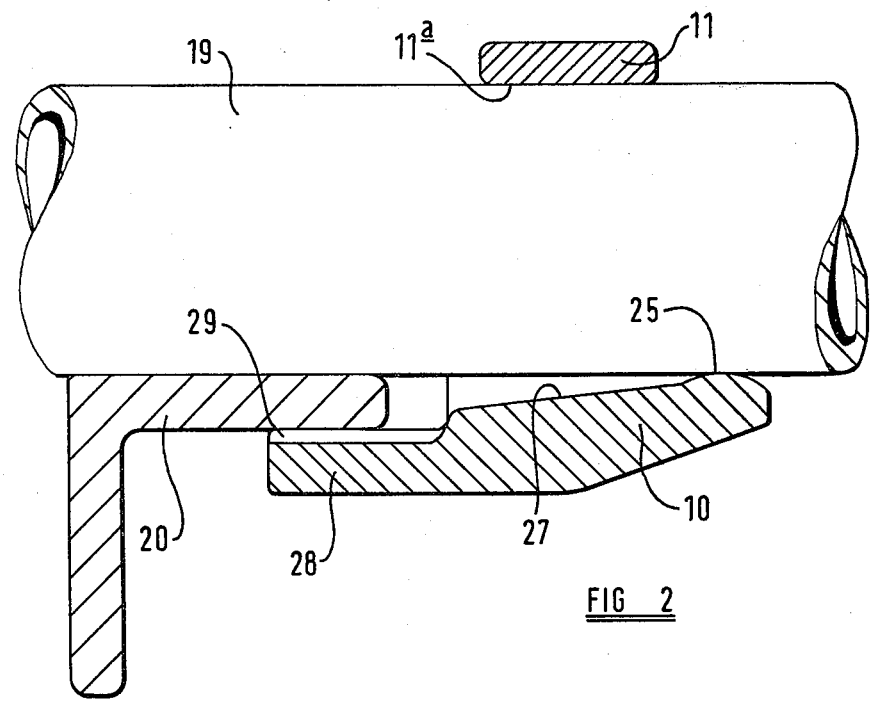
FIG. 2 is a vertical section through the central axis of the scaffolding pole of the arrangement shown in FIG. 1.

The body part 11 comprises an arcuate seat 11a adapted to engage a scaffolding pole on one side thereof, and the body part 10 comprises an arcuate seat 25 adapted to engage the scaffolding pole on the other side thereof. Whilst the arcuate seat 11a is flat in longitudinal cross-section, as is seen in FIG. 2, and is arranged to engage the scaffolding pole over an area, the arcuate seat 25 is convex in longitudinal cross-section, and is adapted to engage the scaffolding pole in substantially line contact. As can be seen from FIG. 2, the seat 25 is spaced from the seat 11a in a direction axially of the pole.

The body of the device may thus be opened, by relative pivotal movement between the body parts about the axis of the pin 24, and the device may be positioned around a scaffolding pole, and said other ends may be brought together on the opposite side of the scaffolding pole. the head 15 of the T-bolt 14 may be located in the pocket 13, and the clamping nut 18 tightened against the bifurcated portion 17, to clamp the body parts around the scaffolding pole.

The body part 10 comprises an integral extension portion 28 which extends from the body part on the side thereof opposite to the seat 25, said extension portion 28 comprising a flange-engaging surface 29, which may if desired be provided with protuberances or ribs, as shown. The extension portion 28 extends generally parallel to the axis of the arcuate seat 25, but when the device is loosely mounted on a scaffolding pole, is inclined when the device is secured to the scaffolding pole at a small angle to the longitudinal axis of the pole, diverging from the pole, in the direction away from the body of the device.

An arcuate surface 27 of the body part 10, which is directly opposite to the body part 11, has an axis which extends downwardly away from and at a slight angle to the axis of the arcuate surface 25, so that when the latter is engaged with the scaffolding pole 19 there is a gap between the surface 27 and the underside of the pole, as seen in FIG. 2.

In the use of the device which is the preferred embodiment of this invention, the device is initially mounted on a scaffolding pole somewhat loosely, allowing the extension portion 28 to be positioned behind the flange 20 of a structural member, and the body parts are drawn together by tightening of the locking nut 18. The axis along which such tightening force is exerted is spaced (in the axial direction) from the arcuate seat 25, and tightening of the locking nut 18 to draw the body part together and also causes the extension portion 28 to move towards the longitudinal axis of the scaffolding pole, clamping the flange 20 against the pole. During such movement of the body member 10, the arcuate seat 25 effects a rolling movement along the scaffolding pole. Additionally, tilting movement of the body part 10 takes place relative to the body part 11, such movement being accommodated by the freedom of the body parts for limited relative tilting movement, as aforesaid.

Thus by tightening of the single nut 18, the body parts 10 and 11 may be secured together firmly around the scaffolding pole, and the flange 20 firmly clamped between the extension portion 28 and the pole 19.

If desired, the arcuate seat 25 may be provided with circumferential ribs, to prevent slipping movement of the body member 10 relative to the scaffolding pole, in the longitudinal direction.

By the use of the present invention, a clamping device for the purpose specified may be produced which is equal in strength and load bearing capability to a conventional device of this kind, but of considerably lesser weight, and thus of more economical manufacture. In the operation of the device according to the invention, clamping may be effected by tightening only a single nut which may be carried out single handed. Further, the number of parts of the device is minimal, allowing simpler and less expensive manufacture, assembly and maintenance.

I claim:

1. A device for clamping together a scaffolding pole and a flange of a construction member, the device comprising first and second body members each having an arcuate seat to engage a surface portion of the scaffolding pole, and having cooperable therebetween screw threaded clamping means,
   wherein the seat of the second body member is curved in a plane extending at right angles to the longitudinal axis of the pole and in a plane extending longitudinally of the pole, said second body member comprising an integral clamping portion which projects away from said seat and has a flange engaging surface, the clamping means being connected to the second body member between the clamping portion and the arcuate seat and comprising a single operating member, rotation of which causing the seat of the second body member to roll around the scaffolding pole and the flange-engaging surface of the clamping portion to move towards the scaffolding pole to bear against and make essentially area contact with the one side of the flange to press the other side thereof against the scaffolding pole to effect a rigid connection therebetween, and causing the body members to clamp around the scaffolding pole.

2. A device according to claim 1 wherein said two body members are pivotally connected together on one side and the clamping means is operative between the body members on the other side of the device.

3. A device according to claim 2 wherein the arcuate seats of the body members are spaced apart in an axial direction with the arcuate seat of the first body member lying in the axial direction between the arcuate seat and the clamping portion of said second body member.

4. A device for clamping together a scaffolding pole and a flange of a construction member, the device comprising:
 (a) a first body member having an arcuate seat to engage one side of a scaffolding pole;
 (b) a second body member connected to the first body member and having an arcuate seat which includes a convex longitudinal cross section to engage the other side of the scaffolding pole at a position spaced axially from the arcuate seat of the first body member;
 (c) an extension integral with the second body member and which extends generally axially away from the arcuate seat thereof and has a flange engaging surface facing the scaffolding pole;
 (d) means operative between the body members to clamp the body members together;
the clamping means comprising a single operating member and the construction and arrangement being such that operation of the clamping means to clamp the body members together on opposite sides of a scaffolding pole is effective to roll the second body member about the arcuate seat thereof causing the extension to move towards the longitudinal axis of the scaffolding pole and make essentially area contact with one side of the flange of the construction member to press the other side of the flange against the scaffolding pole and thereby rigidly clamp the flange of the construction member to the scaffolding pole.

5. A device according to claim 4 wherein an arcuate seat of the first body portion lies in the axial direction between the flange-engaging surface of the extension and the arcuate seat of the second body member.

6. A device according to claim 5 wherein the arcuate seat of the first body member is adapted to engage the scaffolding pole over an area, and the arcuate seat of the second body member is adapted to engage the scaffolding pole in substantially line contact.

7. A device according to claim 6 wherein the arcuate seat of the second body member is convex in longitudinal cross-section, whereby said arcuate seat may effect a rolling action along the scaffolding pole.

8. A device according to claim 2 wherein the body members are connected together in a manner such as to permit limited tilting movement between the body members on tightening of the clamping means.

* * * * *